United States Patent
Grasso et al.

(10) Patent No.: US 6,242,118 B1
(45) Date of Patent: Jun. 5, 2001

(54) METHOD AND APPARATUS FOR REMOVING CONTAMINANTS FROM THE COOLANT SUPPLY OF A FUEL CELL POWER PLANT

(75) Inventors: Albert P. Grasso, Vernon; Leslie L. Van Dine, Manchester, both of CT (US)

(73) Assignee: International Fuel Cells LLC, South Windsor, CT (US)

( * ) Notice: Subject to any disclaimer, the term of this patent is extended or adjusted under 35 U.S.C. 154(b) by 0 days.

(21) Appl. No.: 09/417,816

(22) Filed: Oct. 14, 1999

(51) Int. Cl.[7] .............. H01M 8/00; H01M 8/04; H01M 10/42

(52) U.S. Cl. ............... 429/13; 429/12; 429/17; 429/19; 429/20; 429/26; 429/49

(58) Field of Search ................ 429/12, 13, 17, 429/49, 19, 20, 26

(56) References Cited

U.S. PATENT DOCUMENTS

| | | | |
|---|---|---|---|
| 3,969,145 | 7/1976 | Grevstad et al. | 136/86 |
| 3,994,748 | 11/1976 | Kunz et al. | 429/13 |
| 4,233,369 | 11/1980 | Breault et al. | 429/26 |
| 4,344,850 | 8/1982 | Grasso | 210/664 |
| 4,769,297 | 9/1988 | Reiser et al. | 429/17 |
| 4,801,356 | 1/1989 | Grasso | 203/11 |
| 4,804,591 | 2/1989 | Grasso et al. | 429/12 |
| 4,816,040 | 3/1989 | Bonville et al. | 55/42 |
| 4,973,529 | 11/1990 | Grasso et al. | 429/12 |
| 5,503,944 | 4/1996 | Meyer et al. | 429/13 |

*Primary Examiner*—Stephen Kalafut
*Assistant Examiner*—Angela J. Martin
(74) *Attorney, Agent, or Firm*—McCormick, Paulding & Huber LLP

(57) ABSTRACT

A method and apparatus for removing contaminants from the coolant supply of a fuel cell power plant, wherein coolant which has been exhausted from the fuel cell power plant is fed to an oxidant manifold. The exhausted coolant interacts with the oxidant flowing through the oxidant manifold, thereby effectuating removal of contaminants from the exhausted coolant.

23 Claims, 5 Drawing Sheets

METHOD AND APPARATUS FOR REMOVING CONTAMINANTS FROM THE COOLANT SUPPLY OF A FUEL CELL POWER PLANT

FIELD OF THE INVENTION

This invention relates in general to a method and apparatus for removing contaminants from the coolant supply of a fuel cell power plant, and deals more particularly with a process by which exhausted coolant from a fuel cell assembly interacts with oxidant within an oxidant manifold, thereby removing contaminants from the coolant while reducing the overall size and complexity of the fuel cell power plant.

BACKGROUND OF THE INVENTION

Many types of fuel cells are known in the art, such as solid oxide, molten carbonate, phosphoric acid and proton exchange membrane (PEM) fuel cells. Fuel cells generate electricity by directly converting chemical energy to electrical energy. In a typical fuel cell, an electrolytic medium separates an anode and a cathode. A voltage is produced between the anode and cathode when a fuel is introduced to the anode, an oxidant is introduced to the cathode and the cell is maintained within the correct temperature range. The electrolytic medium allows an ionic species to travel between the cathode and the anode.

The reaction products generated by fuel cells are relatively simple and benign, typically including water and carbon dioxide, thus minimizing environmental concerns. In contrast with fossil fuel based power sources, such as the internal combustion engine, fuel cells are simpler, quieter, non-polluting and have high operating efficiencies. For these and other reasons, fuel cells are considered promising power sources for the future.

In practice, however, operation of a fuel cell stack can be complex. Considerable hardware may be required to support a fuel cell stack, typically comprised of a plurality of individual electrically integrated fuel cell assemblies. Such hardware can include a thermal management subsystem for maintaining the fuel cell stack at the proper temperature, a water management subsystem for handling water generated as a reaction product of operating the fuel cell stack and for maintaining proper humidity throughout the power plant, a fuel subsystem for processing and delivering the fuel reactant to the fuel cell stack, and a blower for delivering the oxidant to the fuel cell stack. Taken as a whole, a fuel cell stack and its operating systems comprise a typical fuel cell power plant.

As understood by one of ordinary skill in the art, the components and subsystems of a fuel cell power plant can vary depending on the application—a phosphoric acid stationary power plant for industrial use will differ from a mobile—(PEM) power plant. Furthermore, a mobile PEM power plant that can be provided with hydrogen as a fuel reactant can differ considerately from a PEM plant for installation in an automobile, which can be required to include a subsystem for producing hydrogen fuel from gasoline. In general, a fuel cell power plant includes those subsystem components necessary for the application for which the power plant is to be used, and that are appropriate to the type of fuel cells incorporated by the fuel cell power plant.

In order to control the temperature within a fuel cell assembly, a coolant is provided to circulate about the fuel cell assembly, usually water. The use of reformed fuels within fuel cell assemblies makes them particularly sensitive to possible water contaminants.

Electrochemical fuel cell assemblies typically employ hydrogen as the fuel and oxygen as an oxidant where, as noted above, the reaction by-product is water. Such fuel cell assemblies may employ a membrane consisting of a solid polymer electrolyte, or ion exchange membrane, disposed between the two electrodes formed of porous, electrically conductive sheet material—typically carbon fiber paper. The ion exchange membrane is also known as a proton exchange membrane (hereinafter PEM), such as sold by DuPont under the trade name NAFION™, and has a catalyst layer formed thereon which results in a membrane-electrode that promotes the desired electrochemical reaction.

In operation, hydrogen fuel permeates the porous electrode material of the anode and reacts with the catalyst layer to form hydrogen ions and electrons. The hydrogen ions migrate through the membrane to the cathode and the electrons flow through an external circuit to the cathode. At the cathode, the oxygen-containing gas supply also permeates through the porous electrode material and reacts with the hydrogen ions and the electrons from the anode at the catalyst layer to form the by-product water. Not only does the ion exchange membrane facilitate the migration of these hydrogen ions from the anode to the cathode, but the ion exchange membrane also acts to isolate the hydrogen fuel from the oxygen-containing gas oxidant. The reactions taking place at the anode and cathode catalyst layers are represented by the equations:

Anode reaction: $H_2 \rightarrow 2H^+ + 2e$

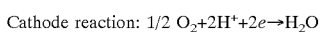

Cathode reaction: $1/2\ O_2 + 2H^+ + 2e \rightarrow H_2O$

Conventional PEM fuels cells have the ion exchange membrane positioned between two gas-permeable, electrically conductive plates, referred to as the anode and cathode plates. The plates are typically formed from graphite, a graphite-polymer composite, or the like. The plates act as a structural support for the two porous, electrically conductive electrodes, as well as serving as current collectors and providing the means for carrying the fuel and oxidant to the anode and cathode, respectively. They are also utilized for carrying away the reactant by-product water during operation of the fuel cell.

When flow channels are formed within these plates for the purposes of feeding either fuel or oxidant to the anode and cathode plates, they are referred to as fluid flow field plates. These plates may also function as water transfer plates in certain fuel cell configurations. When these plates simply overlay channels formed in the anode and cathode porous material, they are referred to as separator plates. Moreover, the plates may have formed therein reactant feed manifolds which are utilized for supplying fuel to the anode flow channels or, alternatively, oxidant to the cathode flow channels. They also have corresponding exhaust manifolds to direct unreacted components of the fuel and oxidant streams, and any water generated as a by-product, from the fuel cell. Alternatively, the manifolds may be external to the fuel cell itself, as shown in commonly owned U.S. Pat. No. 3,994,748 issued to Kunz et al. and incorporated herein by reference in its entirety.

The catalyst layer in a fuel cell assembly is typically a carbon supported platinum or platinum alloy, although other noble metals or noble metal alloys may be utilized. Multiple electrically connected fuel cells consisting of two or more anode plate/membrane/cathode plate combinations are referred to as a fuel cell stack. A fuel cell stack is typically electrically connected in series.

Recent efforts at producing the fuel for fuel cell assemblies have focused on utilizing hydrogen rich streams produced from the chemical conversion of hydrocarbon fuels, such as methane, natural gas, gasoline, methanol or the like, into hydrogen. This process requires that the hydrogen produced must be efficiently converted to be as pure as possible, thereby ensuring that a minimal amount of carbon monoxide and other undesirable chemical byproducts are produced. This conversion of hydrocarbons is generally accomplished through the use of a steam reformer or an auto-thermal reformer. Reformed hydrocarbon fuels frequently contain quantities of ammonia, $NH_3$, as well as significant quantities of carbon dioxide, $CO_2$. These gases tend to dissolve and dissociate into the water which is provided to, and created within, the fuel cell assembly. The resultant contaminated water supply may cause the conductivity of the water to increase to a point where shunt current corrosion occurs in the coolant channels and manifold leading to degradation of fuel cell materials, as well as reducing the conductivity of the PEM and thereby reducing the efficiency of the fuel cell assembly as a whole.

As disclosed above, the anode and cathode plates provide coolant channels for the circulation of a water coolant, as well as for the wicking and carrying away of excessive water produced as a by-product of the fuel cell assembly operation. The water so collected and circulated through a fuel cell assembly in the coolant channels is susceptible to contamination and may therefore damage and impair the operation of the fuel cell assembly as the contaminated water circulates throughout the fuel cell assembly.

It is therefore necessary to provide a system which may protect the fuel cell assembly from water contamination, such as is described in commonly owned U.S. Pat. No. 4,344,850 issued to Grasso and incorporated herein by reference in its entirety. Grasso's system for treating the coolant supply of a fuel cell assembly, as illustrated in FIG. 1 of U.S. Pat. No. 4,344,850, utilizes a filter and demineralizer for purifying a portion of the coolant supplied to the fuel cell assembly. A deaerator is also utilized to process the condensed water obtained from a humidified cathode exit stream. As discussed in Grasso, the heat exchange occurring between the coolant stream and the body of the fuel cell assembly is accomplished according to commonly assigned U.S. Pat. No. 4,233,369, issued to Breault et al., incorporated herein by reference in its entirety. It is important to note that Grasso's coolant system does not provide for the cleansing of the coolant stream as a whole. This is due to the fact that the coolant conduits in Grasso, being fashioned from copper or the like, are not in diffusable communication with the body of the fuel cell assembly and as such, the coolant stream does not receive contamination from, inter alia, the $CO_2$ or $NH_3$ when present in the reformed fuel stream. The burden of cleansing the coolant stream in Grasso is therefore born solely by the filter and demineralizer and would result in greater wear on these components and hence greater repairs and more frequent replacements, if diffusable contamination occurs.

Degassifiers have also been utilized in fuel cell power plants to assist in the removal of the $CO_2$ or $NH_3$ gasses from the coolant supply, such as illustrated in commonly assigned co-pending U.S. application Ser. No. 09/295,732, filed on Apr. 20, 1999, entitled "WATER TREATMENT SYSTEM FOR A FUEL CELL ASSEMBLY", herein incorporated by reference in its entirety.

The inclusion, however, of separate deaerators and degassifiers in a fuel cell power plant increases the complexity of such a system, as well as corresponding increase in the energy required to operate such a system.

With the forgoing problems and concerns in mind, it is the general object of the present invention to provide a fuel cell power plant with a method and apparatus for removing contaminants from the coolant supply which overcomes the above-described drawbacks.

SUMMARY OF THE INVENTION

It is an object of the present invention to provide a method and apparatus for the removal of contaminants from a coolant supply of a fuel cell power plant.

It is another object of the present invention to reduce the complexity and cost of a fuel cell power plant.

It is another object of the present invention to integrate the coolant supply contaminant removal system with an oxidant manifold of a fuel cell power plant.

It is another aspect of the present invention to accomplish the removal of contaminants from a coolant supply of a fuel cell power plant while also providing a reservoir of coolant to assist in potential thermal upsets of the fuel cell power plant.

It is another aspect of the present invention to reduce the contaminant removal burden on a demineralizer of the fuel cell power plant.

It is another aspect of the present invention to provide for better regulation of the fuel cell power plant as a whole.

According to one embodiment of the present invention, a method is provided for removing contaminants from a coolant supply of a fuel cell power plant, including a plurality of electrically integrated fuel cell assemblies and an oxidant manifold.

An oxidant is flowed through the oxidant manifold while the coolant is exhausted from the plurality of electrically integrated fuel cell assemblies. The exhausted coolant and the oxidant are subsequently exposed to one another within the oxidant manifold to effectuate the removal of contaminants from the exhausted coolant.

An exit from the oxidant manifold is provided so as to allow the exposed coolant to drain from the oxidant manifold. The drained coolant is subsequently redirected back into the fuel cell power plant.

These and other objectives of the present invention, and their preferred embodiments, shall become clear by consideration of the specification, claims and drawings taken as a whole.

DETAILED DESCRIPTION OF THE PREFERRED EMBODIMENT

Figure 1:
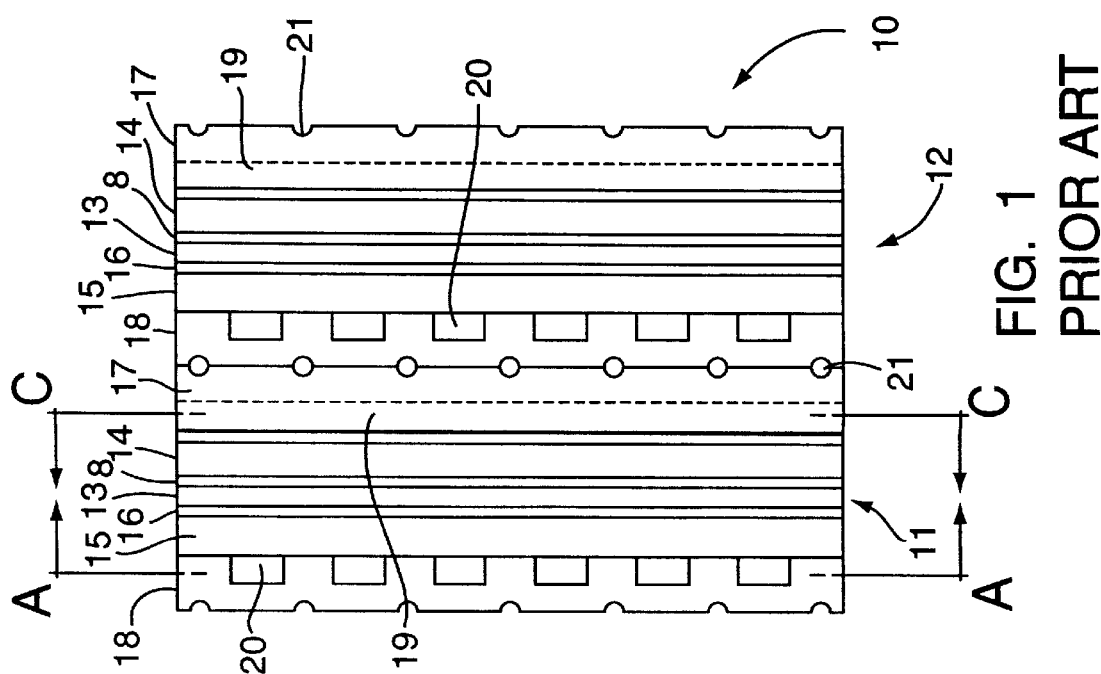
FIG. 1 illustrates a section taken through two PEM fuel cells arranged in series.

FIG. 1 illustrates a sectional view of a partial fuel cell stack 10 having two electrochemical fuel cell assemblies, 11 and 12, arranged in series contact. Each fuel cell assembly, 11 and 12, produces approximately 0.6–0.7 V. In order to produce a desired power supply it is necessary for a great many fuel cells to be electrically joined together. The fuel cell assemblies 11 and 12 each employ an ion exchange membrane 13 consisting of a solid polymer electrolyte disposed between an anode electrode substrate 15 and a cathode electrode substrate 14. The ion exchange membrane 13 is also referred to as a proton exchange membrane (PEM) and can be a plastic-type film approximately 0.001 inch thick. The cathode and the anode electrode substrates, 14 and 15 respectively, are formed of porous, electrically conductive sheet material—typically carbon fiber paper having a Teflon® coating.

The ion exchange membrane 13 has a catalyst layer formed on either side of the membrane 13, thereby forming a catalyst-membrane interface which acts to promote the desired electrochemical reaction. The anode catalyst 16 and the cathode catalyst 8 are typically chosen from one of the noble metals, such as platinum, or a noble metal alloy, such as platinum-ruthenium, or the like. The anode electrode substrate 15 in the fuel cell 11 and the cathode electrode substrate 14 in the fuel cell 12 are then electrically coupled in order to provide a path for conducting electrons between the fuel cells 11 and 12 when an external load is applied.

Still in reference to FIG. 1, fuel is supplied to the anode electrode substrate 15 through the fuel channels 20 formed within an anode flow field plate 18, while an oxidant is supplied to the oxidant channels 19 within a cathode flow field plate 17. The fuel and oxidant together are referred to as reactants. The fuel channels 20 are typically arranged approximately orthogonal to the oxidant channels 19. The fuel channels 20 and oxidant channels 19 may be engraved, milled or molded in the surface of the anode or cathode flow field plates, 18 and 17 respectively, and may be one continuous channel or a plurality of channels. In addition, the fuel and oxidant may be fed through the fuel cell stack 10 utilizing axial feed manifolding, exterior manifolding or a combination of the two.

The anode and cathode flow field plates, 18 and 17, may be formed from a porous graphite or a porous graphite-polymer composite, as discussed previously. While the pore size of each of the plates 18 and 17 may differ, typical pore diameters in the plates 18 and 17 range from approximately 1 micrometer to approximately 5 micrometers. Alternatively, a fuel cell 11 wherein only one of the anode and cathode flow field plates, 18 and 17 respectively, is porous, is also contemplated and may be employed without departing from the broader aspects of the present invention.

In operation, hydrogen fuel permeates the porous electrode material of the anode electrode substrate 15 and reacts at the anode catalyst 16 to form protons and electrons. The protons migrate through the membrane 13 to the cathode electrode substrate 14. The electrons produced at the anode catalyst layer 16 in the fuel cell 12 flow through the cathode electrode substrate 14 in the fuel cell 11, through both the anode flow field plate 18 of the fuel cell 12 and the cathode flow field plate 17 of the fuel cell 11. At the cathode 14, the oxidant also permeates through the porous electrode material and reacts with the hydrogen ions and the electrons at the catalyst layer 8 to form the by-product water. Not only does the ion exchange membrane 13 facilitate the migration of these hydrogen ions from the catalyst layer 16 to the catalyst layer 8, but the ion exchange membrane 13 also acts to isolate the hydrogen fuel flowing through fuel channels 20 from the oxygen-containing gas oxidant as it moves through the oxidant channels 19.

A coolant, typically water, is supplied to the fuel cells 11 and 12 through coolant channels 21 formed in the anode and cathode flow field plates, 18 and 17 respectively, for the purpose of removing excess heat generated by the electrochemical reaction taking place within fuel cells 11 and 12, as well as for humidifying the reactants and providing for the removal of by-product water. Alternatively, a fuel cell 11 wherein only one of the anode and cathode flow field plates, 18 and 17 respectively, has coolant channels 21 formed therein, is also contemplated and may be employed without departing from the broader aspects of the present invention.

While a proton exchange membrane, noble metal catalyst and carbon fiber paper having a Teflon® coating have been described, the present invention is not limited in this regard as other membranes and electrode materials may be alternatively utilized, providing they allow for the necessary flow of reactant and by-product molecules and ions. Likewise, fuel cells having a non-solid acid based electrolyte or other fuel cell configurations, such as are disclosed in commonly assigned U.S. Pat. No. 4,769,297, issued to Reiser et al., and U.S. Pat. No. 5,503,944, issued to Meyer et al., herein incorporated by reference in their entirety, may also be employed without departing from the broader aspects of the present invention.

Figure 2:
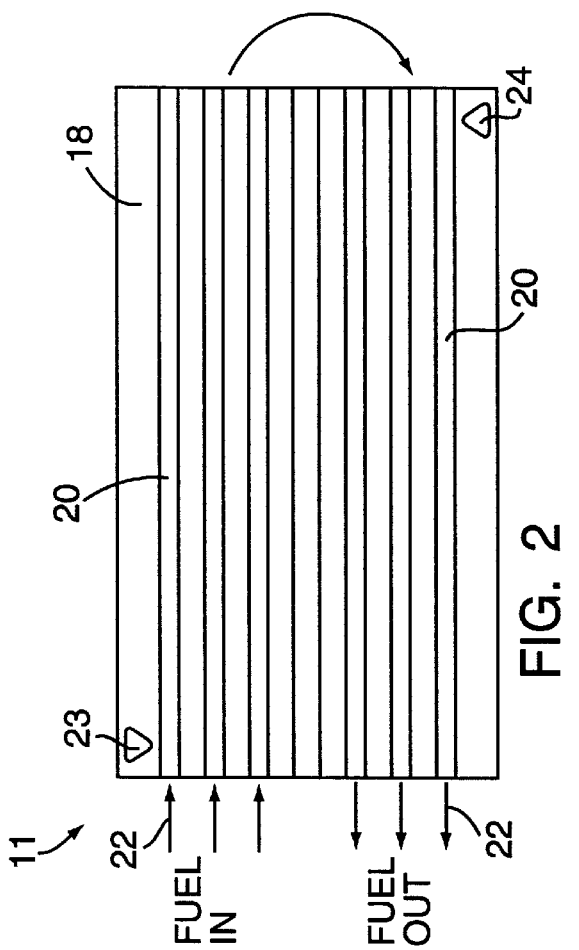
FIG. 2 is a simplified plan illustration of an anode side of a fuel cell, taken in section along line A of FIG. 1.

FIG. 2 illustrates a section taken along line A of FIG. 1 showing a plan view of the anode side of, for example, the fuel cell 11, including the fuel channels 20 of the anode flow field plate 18. As can be seen from FIG. 2, a fuel supply 22 is supplied to one half of the fuel cell 11 and travels the length of the fuel channels 20. As the fuel supply 22 exits fuel cell 11, the fuel supply 22 is directed towards the downstream side of the fuel cell 11 by an unillustrated fuel turn manifold. In this way, the fuel supply 22 is exposed to the entire anode side of the fuel cell 11. It should be readily apparent that were the single fuel cell 11 but one in a stack of fuel cells, one-half of each fuel cell so stacked would receive the fuel supply 22 initially, while the other half of each fuel cell in the stack would receive fuel supply 22 after redirection by the unillustrated fuel turn manifold. Additionally, FIG. 2 shows axial inlet and exhaust coolant manifolds, 23 and 24 respectively, which are utilized for supplying a water coolant to a plurality of coolant channels 21. The architecture of FIG. 2 represents a two-pass flow system owing to the fuel supply 22 making two passes across the surface of the fuel cell 11. A greater number of passes may also be arranged with a corresponding increase in fuel turn manifolds, as is known to those so skilled in the art.

Figure 3:
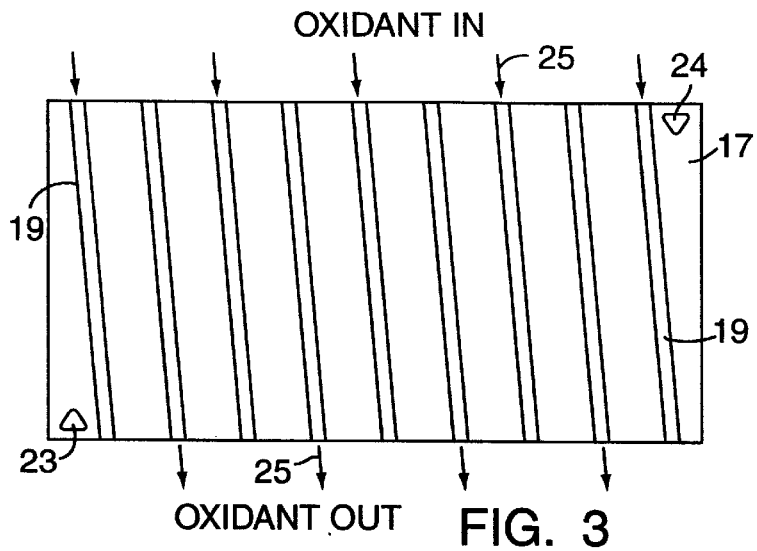
FIG. 3 is a simplified plan illustration of an cathode side of a fuel cell, taken in section along line C of FIG. 1.

FIG. 3 illustrates a section taken along line C of FIG. 1 showing a plan view of the cathode side of, for example, the fuel cell 11, including the oxidant channels 19 of the cathode flow field plate 17. As can be seen from FIG. 3, an oxidant stream 25 is supplied to one entire side of the fuel cell 11 and travels the length of the oxidant channels 19 until emerging at the far side thereof. In this way, the entire cathode side of the fuel cell 11 is exposed to the oxidant stream 25 without the use of an oxidant turn manifold. It should be readily apparent, however, that the oxidant fuel stream 25 may also be configured to incorporate an oxidant turn manifold to produce an oxidant flow pattern similar to the fuel supply pattern as illustrated in FIG. 2. Additionally, FIG. 3 also shows axial inlet and exhaust coolant manifolds, 23 and 24 respectively, which are utilized for supplying a coolant such as water to a plurality of coolant channels 21.

It should be readily apparent that the anode and cathode flow field plates, 18 and 17, may alternatively have any number of fuel and oxidant channels, linear or not, as long as the fuel cell 11 is approximately uniformly supplied with these reactants.

With reference once again to FIG. 1, the present invention is directed towards a system for treating the coolant, typically water, circulating within the fuel cell stack 10. The coolant channels 21 of the fuel cell stack 10 serve to address two main concerns of an operating fuel cell assembly; the water management of a fuel cell assembly, as well as the thermal management of a fuel cell assembly. In a PEM fuel cell assembly, for example, the fuel cell assembly 11 as shown in FIG. 1, the PEM 13 must be sufficiently hydrated for the fuel cell assembly 11 to operate and continue to facilitate the migration of ions across the PEM 13. One manner in which the PEM 13 remains hydrated during operation of the fuel cell assembly 11 is by humidifying both the fuel and oxidant streams traveling within the fuel and oxidant channels 20 and 19, respectively. In connection with the hydrogen ions migrating across the PEM 13, as discussed previously, a phenomenon called "proton drag" takes place, causing some water contained within the PEM 13 to be dragged through the PEM 13 from the anode side to the cathode side of the PEM 13. Water is supplied to the anode side of the PEM 13 by evaporation from the anode flow field plate 18, thereby providing a measured amount of hydration for the PEM 13.

The proton dragging of water molecules across the PEM 13 acts to dehydrate the PEM 13 to some extent, while it also results in a buildup of water at the cathode 14 of the fuel cell assembly 11. In addition, the byproduct water formed within the fuel cell assembly 11 as a result of the reaction between the oxidant carried in oxidant channels 19 and the hydrogen ions migrating across the PEM 13 and the electrons migrating across the flow field plates, 17 and 18, also result in a buildup of water at the cathode 14. The coolant channels 21, however, serve to dispose of the excess water gathered at the cathode 14, as well as internally re-hydrating the PEM 13. This water management is typically accomplished through a balancing of pressures in the oxidant channels 19, coolant channels 21 and fuel channels 20. An oxidant is fed through the oxidant channels 19 and a fuel is fed through the fuel channels 20 at a pressure somewhat higher than the pressure of a coolant being fed through the coolant channels 21.

With this arrangement, the excess water molecules at the cathode 14 of the fuel cell assembly 11 have a natural tendency to flow through the porous material of the cathode flow field plate 17 and into the coolant channels 21. Therefore, not only do the coolant channels 21 absorb excess water from the cathode 14 of the fuel cell assembly 11, but they also facilitate the flow of water molecules from the coolant channels 21, through the porous anode flow field plate 18, to thereby re-hydrate the anode side of the PEM 13. In this manner, a judicious balance of the pressures within the oxidant channels 19, the coolant channels 21 and the fuel channels 20 serves to provide an adequate supply of water at the anode 18, ensures the hydration of the PEM 13 and purges any excess water built-up at the cathode 14.

The coolant channels 21 of the fuel cell assembly 11 shown in FIG. 1 further provide for the thermal management of the fuel cell assembly 11, as well as the fuel cell stack 10 as a whole. By circulating about each fuel cell assembly 11 in a fuel cell stack 10, the water coolant carries away excess heat generated by the chemical reactions taking place within the fuel cell stack 10. The temperature of the fuel cell stack 10 can, therefore, be controlled by regulating the temperature and the flow of the coolant through the coolant channels 21.

In operation, it is desired that pure hydrogen be utilized as the fuel supply for the fuel cells 11 and 12 shown in FIG. 1, but such pure hydrogen is often expensive to obtain and store. Other hydrocarbons, such as methane, natural gas, methanol and gasoline, are therefore utilized as a fuel, but only after these hydrocarbons have undergone a known reformation process to convert the hydrocarbons to a hydrogen rich fuel.

As mentioned previously, reformed hydrocarbon fuels frequently contain quantities of ammonia, $NH_3$, and hydrogen, $H_2$, as well as significant quantities of carbon dioxide, $CO_2$. The $NH_3$ and $CO_2$ gases dissolve and dissociate into the water coolant which is provided to, and created within, the fuel cell assembly. The gases react with the water and form ionic reaction by-products. The resultant contaminated water supply may cause the conductivity of the water to increase to a point where shunt current corrosion occurs in the coolant channels 21 and the coolant inlet and exhaust manifolds, 23 and 24, respectively. Over time, these increased shunt currents may be on the order of 10 times the magnitude present in fuel cells having water not so contaminated by a reformed hydrogen fuel. In addition to increased shunt currents, concentrations of ammonia even as small as 2 parts per million (ppm) can act to displace protons in the PEM 13, thereby reducing the conductivity of the PEM 13 and thus, the efficiency of the fuel cell assembly as a whole. Dissolved gases within the coolant may also result in gas bubbles in the coolant flow field of the fuel cell stack 10 which may cause drying of the anode and cathode flow field plates, 18 and 17, respectively, thereby resulting in mixing of the reactants.

With $NH_3$ and $CO_2$ dissolved in the coolant, purifying the coolant water of a fuel cell stack 10 by utilizing only a demineralization apparatus, as illustrated in previously cited U.S. Pat. No. 4,344,850, would result in significantly increasing the water clean-up burden and is impractical, both in the size of the demineralizer required and in its economic cost. In addition, only a small portion of the circulating water coolant, flowing through the fuel cell stack, is treated in the U.S. Pat. No. 4,344,850.

While it should be readily apparent that utilizing water as a coolant within a fuel cell stack 10 is beneficial for the purposes of water and thermal management, problems arise when a fuel cell stack 10, so equipped, experiences contamination of the water coolant, as invariably occurs. It would therefore be very beneficial to equip a fuel cell stack 10 so as to remove the contaminants from the coolant supply while preventing damage to the fuel cell stack 10 due to the resultant effects of such contamination, as discussed above.

Figure 4:
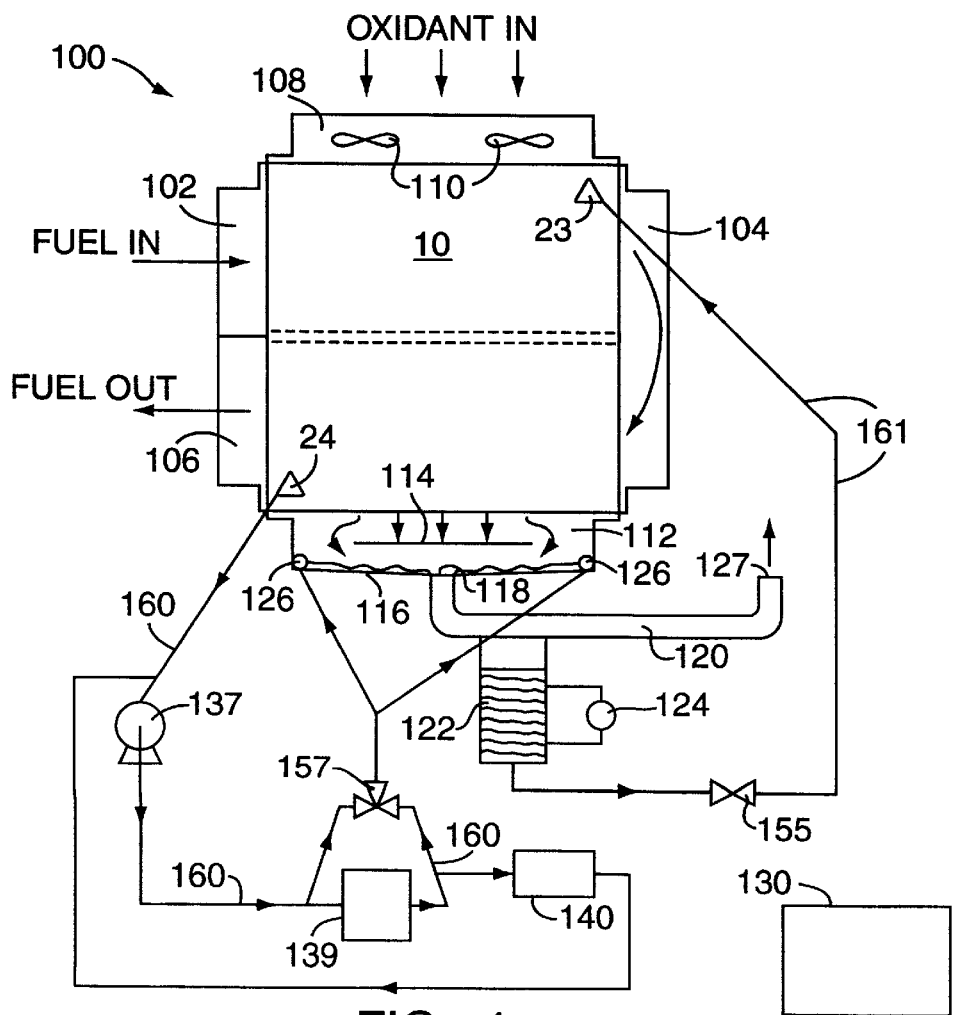
FIG. 4 is a simplified schematic illustration of a fuel cell power plant providing for contaminant removal, according to one embodiment of the present invention.

It is a major aspect of the present invention, therefore, to provide an integrated fuel cell power plant with a method and apparatus for removing contaminants from the coolant supply. FIG. 4 illustrates one such integrated fuel cell power plant 100 according to an embodiment of the present invention. While a fuel cell power plant 100, including a fuel cell stack 10 is shown in FIG. 4, it will be readily appreciated that the method and apparatus for removing contaminants from the coolant supply of the fuel cell power plant 100 is operable with either a single fuel cell assembly 11 or a fuel cell stack 10.

As shown in FIG. 4, the fuel cell stack 10 includes a fuel inlet manifold 102, a fuel turn manifold 104 and a fuel exhaust manifold 106. The fuel manifolds, 102, 104 and 106 respectively, serve to supply the fuel cell stack 10 with a reactant fuel, typically a hydrogen rich fuel, from an unillustrated fuel processing system. The fuel cell stack 10 further includes an oxidant inlet manifold 108 equipped with inlet fans 110. The inlet fans 110 are positioned within the oxidant inlet manifold and draw a reactant oxidant, typically oxygen-containing air, into and through the fuel cell stack 10. An oxidant exhaust manifold 112 is utilized to vent the exhausted oxidant from the fuel cell stack 10 and will be described in more detail later.

Although the inlet fans 110 have been described as being located within the oxidant inlet manifold 108, the present invention is not limited in this regard as the inlet fans 110 may alternatively be located within the oxidant exhaust manifold 112 in a manner as disclosed in commonly assigned U.S. application Ser. No. 09/265,139, filed on Mar. 8, 1999, entitled: "METHOD AND APPARATUS FOR IMPROVED DELIVERY OF INPUT REACTANTS TO A FUEL CELL ASSEMBLY", herein incorporated by reference in its entirety, without departing from the broader aspects of the present invention. Alternatively, an air blower, external to the fuel cell stack, may be used to supply oxidant to the fuel cell stack as is well known.

Still in reference to FIG. 4, a coolant supply which has circulated throughout the fuel cell stack 10 is exhausted through the coolant exit manifold 24 and is subsequently carried away by a coolant conduit 160. In circulating throughout the fuel cell stack 10, the coolant absorbs and carries away heat generated by the fuel cell stack 10, as well as becoming contaminated with dissolved and dissociated gases and suspended solids. The exhausted and condensed coolant is subsequently directed by a coolant pump 137 to a thermal control valve 157, situated along the coolant conduit 160. The thermal control valve 157 selectively causes a measured amount of the exhausted coolant to be fed to a coolant heat exchanger 139, comprising a fan apparatus or the like, which is operable to remove a portion of the absorbed heat from the exhausted coolant. A demineralizer 140 is also utilized and is provided with a predetermined amount of the exhausted coolant by the coolant conduit 160 to accomplish a reduction of suspended and dissolved solids from the exhausted coolant. The coolant heat exchanger 139 is preferably located upstream of the demineralizer 140 so as to provide the exhausted coolant at a temperature appropriate for proper functioning of the demineralizer 140, approximately 140° F. or less.

While the combined operation of the coolant heat exchanger 139 and the demineralizer 140 partially addresses the problem of removing suspended and dissolved solids from the exhausted coolant, a conventional fuel cell power plant would additionally require a deaerator and/or a degassifier to remove dissolved gasses from the exhausted coolant before reintroducing the coolant back into the fuel cell stack 10. The fuel cell power plant 100 depicted in FIG. 4, however, utilizes a contaminant removal system integrated into the oxidant exhaust manifold 112 for these purposes.

As is illustrated in FIG. 4, the oxidant exhaust manifold 112 is adapted to include an oxidant baffle 114, coolant distributors 126 and an inclined housing 116. An exit 118 is defined at a low point of the inclined housing 116 and is fixed to an exhaust conduit 120. The thermal control valve 157 directs a predetermined amount of the exhausted coolant to the oxidant exhaust manifold 112 where the exhausted coolant drains down the inclined housing 116 and exits the oxidant exhaust manifold 112 via the exit 118. The exhausted coolant drains through the exhaust conduit 120 and into an accumulator well portion 122, where the coolant level is monitored by a coolant level sensor 124. The treated coolant in the accumulator well portion 122 is slightly above ambient pressure and therefore the coolant pump draws the coolant from within the accumulator well portion 122 to return the treated coolant to the fuel cell stack 10 at a pressure slightly lower than ambient. A trim valve 155 is subsequently utilized to control the volume and pressure of the treated coolant as it is redirected back to the fuel cell stack 10 via a coolant supply conduit 161. The exhaust conduit 120 is preferably formed from a corrosion resistant material, such as but not limited to a polymer or fiber reinforced plastic material, so as not to further contaminate the coolant flow.

As the exhausted coolant drains down the inclined housing 116 it comes into contact with a flow of oxidant exhausted from the fuel cell stack 10. Propelled by the inlet fans 110, the oxidant emerges from the fuel cell stack 10 and is incident upon the oxidant baffle 114, thereby spreading the exhausted oxidant approximately uniformly over the entire surface of the draining exhausted coolant. This large liquid-coolant/air-oxidant interface removes dissolved gasses, primarily $NH_3$ and $CO_2$, from the exhausted coolant, while also providing for the removal of gas bubbles from the exhausted coolant. After passing over the exhausted coolant, the exhausted oxidant is then vented to the outside via a venting orifice 127 of the exhaust conduit 120.

A system controller 130, such as a computer system having a display, as well as data input and output capabilities, controls the operation of the fuel cell power plant 100. Depending upon the size of the fuel cell power plant 100, the operating load placed upon the fuel cell power plant 100 and the environmental conditions at any given time, the system controller 130 directs the operation of the various components of the fuel cell power plant 100, including coordinating the fuel and oxidant supply to the fuel cell stack 10. During normal operation, the fuel cell stack 10 will ideally have a coolant supply which drains into the accumulator well portion 122 at approximately the same rate as coolant is supplied to the coolant inlet manifold 23. For a 50 kilowatt PEM fuel cell power plant, the system controller 130 typically maintains a coolant flow rate of approximately 10,000 pounds per hour. If the coolant level sensor 124 detects that the coolant in the accumulator well portion 122 has fallen below a predetermined minimum volume, a control signal is transmitted to the system controller 130 to reduce rate of water loss from the power plant of the fuel cell stack 10 by reducing the flow of reactants to the fuel cell stack 10 within predetermined limits. In extreme cases, control signals may be transmitted to the system controller 130 to shut down the power plant as a whole.

The exhausted coolant may be supplied to the interior of the oxidant exhaust manifold 112 by a number of alternative methods. As shown in FIG. 4, the exhausted coolant may be directed to a pair of coolant distributors 126 which are arranged so as to run along the interior edges of the oxidant exhaust manifold 112. These coolant distributors 126 include a plurality of fine apertures extending the length of the coolant distributors 126 through which the exhausted coolant may stream so as to drain down the inclined housing 116, eventually reaching the exit 118. By utilizing this method, a long, thin liquid coolant layer covering approximately the entire surface area of the inclined housing 116, approximately between 5 to 10 square feet of liquid coolant/air-oxidant interface, may be accomplished.

Figure 4A:
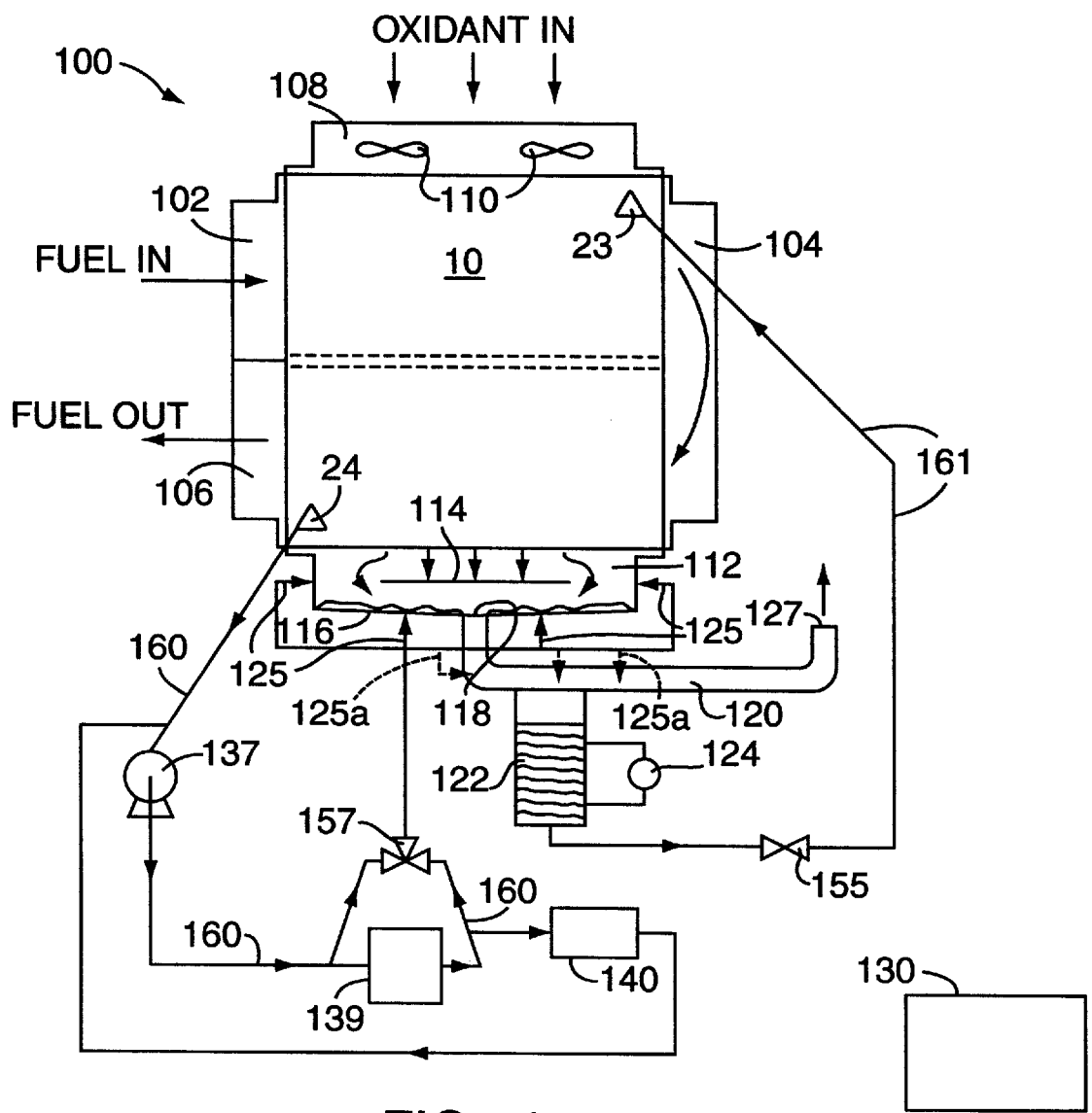

FIG. 4a illustrates another alternative method by which the exhausted coolant may interface with the oxidant exiting the fuel cell stack 10. In this embodiment, a plurality of nozzles 125 are utilized to spray the exhausted coolant within the oxidant exhaust manifold 112 while the exhausted oxidant is expelled from the fuel cell stack 10. By incorporating spray nozzles 125, the embodiment of FIG. 4a provides an even greater liquid-coolant/air-oxidant interface to assist in the subsequent removal of potentially harmful contaminants. Moreover, a plurality of spray nozzles 125a may be utilized to spray a portion of the exhausted coolant into the exhaust conduit 120. It will be readily appreciated that the spray nozzles 125a may be utilized alone or in combination with the spray nozzles 125. While the embodiment depicted in FIG. 4a is shown as operating off of the coolant pump 137, the present invention is not limited in this regard as a separate high pressure pump may be alternatively utilized to promote the spraying of the exhausted coolant, without departing from the broader aspects of the present invention.

While several methods for providing the necessary liquid-coolant/air-oxidant interface have been described, the present invention is not limited in this regard as other alternative methods may also be utilized so long as the exhausted coolant and the exhausted oxidant are brought into intimate contact with one another within the oxidant exhaust manifold 112. Moreover, the present invention need not be limited to those configurations where the liquid-coolant/air-oxidant interface occurs exclusively in the oxidant exhaust manifold 112 as such an interface may also occur within the oxidant inlet manifold 108 without departing from the broader aspects of the present invention.

As discussed previously, during normal operation of the fuel cell power plant 100, the amount of treated coolant which is fed to the fuel cell stack 10 should be approximately equal to the amount of coolant which is draining into the accumulator well portion 122. However, during shutdown of the fuel cell power plant 100, coolant from the fuel cell stack 10 and the plumbing of the fuel cell power plant 100 will largely drain down to the exhaust conduit 120 and the accumulator well portion 122.

Figure 5:
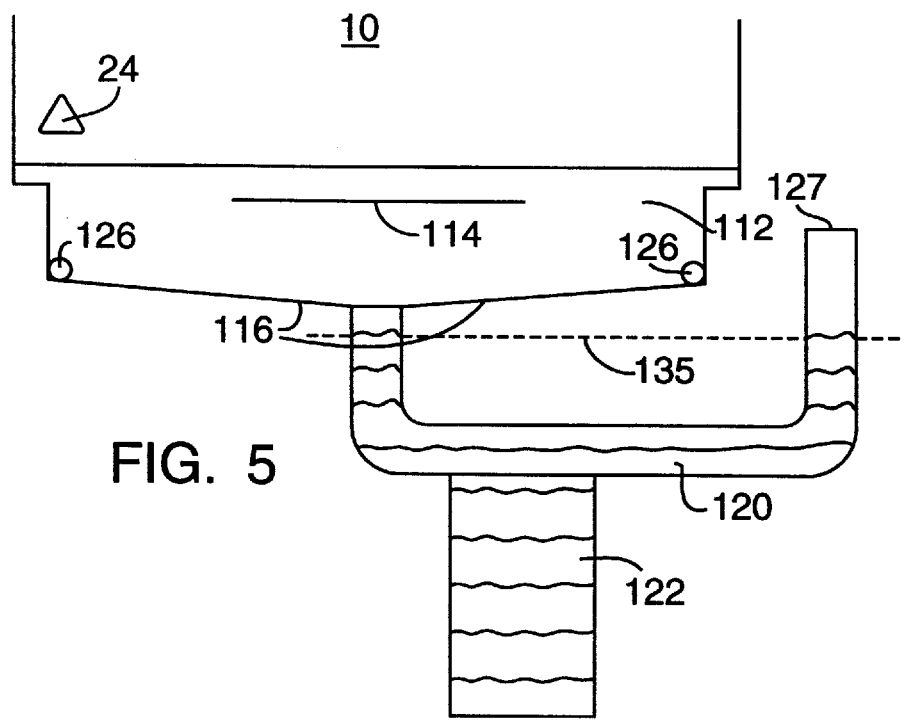
FIG. 5 is a simplified schematic illustration of the fuel cell power plant of FIG. 4 during shutdown.

FIG. 5 illustrates the state of the oxidant exhaust manifold 112, the exhaust conduit 120 and the accumulator well portion 122 during times of normal shutdown. The exhaust conduit 120 and the accumulator well portion 122 are preferably formed according to the size of the fuel cell power plant 100 so as to accommodate approximately the entire volume of coolant which will have drained from the fuel cell stack 10 and the associated plumbing of the fuel cell power plant 100. A shutdown line 135 illustrates the preferred level of coolant during times of shutdown of the fuel cell power plant 100. The remaining volume within the exhaust conduit 120, as well as the venting orifice 127, provides a stress relief for the volumetric expansion of the drained coolant should freezing temperatures occur during or after shutdown, temperatures approximately 32° F. or less for a typical fuel cell power plant employing a water coolant. Alternatively, if space considerations dictate that a particular fuel cell power plant cannot be equipped with an exhaust conduit 120 and an accumulator well portion 122 capable of accommodating the entire volume of drained coolant during shutdown, the drained coolant will begin to fill the oxidant exhaust manifold 112 and fuel cell stack 10, to a level equal to the plane defined by the opening of the venting orifice 127. In such situations, the exhaust conduit 120 may be extended so as to raise the venting orifice 127 above the anticipated coolant level within the fuel cell stack 10 during shutdown in order to avoid loss of coolant from the fuel cell power plant 100.

It is therefore a major aspect of the present invention that by directing the exhausted coolant in this manner, effective deaeration and degasssification of the exhausted coolant may be accomplished without the need for separate deaerators or degassifiers. Moreover, the space occupied by the fuel cell power plant 100 may be correspondingly reduced while also relieving the fuel cell power plant 100 from the repair and replacement costs inherent in fuel cell power plants having separate deaerators or degassifiers.

It is another major aspect of the present invention to provide a reservoir of coolant within the accumulator well portion 122 which can be utilized, through the instructions of the system controller 130, to assist in the thermal management of the fuel cell power plant 100 during incidences of thermal upsets. During these times of thermal upsets, the system controller 130 can regulate both temperature and pressure of the coolant from the accumulator well 122 portion which is to be redirected back to the fuel cell power plant 100.

The fuel cell power plant 100 of the present invention significantly reduces the amount of ammonia, carbon dioxide and hydrogen within the coolant stream of the fuel cell stack 10 by treating the entire coolant stream. Consequently, according to a major aspect of the present invention, the build-up of these gases within the coolant stream of the fuel cell stack 10 can be reduced, as well as extending the time between maintenance on the demineralizer 140 due to the significantly lowered amount of these contaminants seen by the demineralizer 140.

Figure 7:
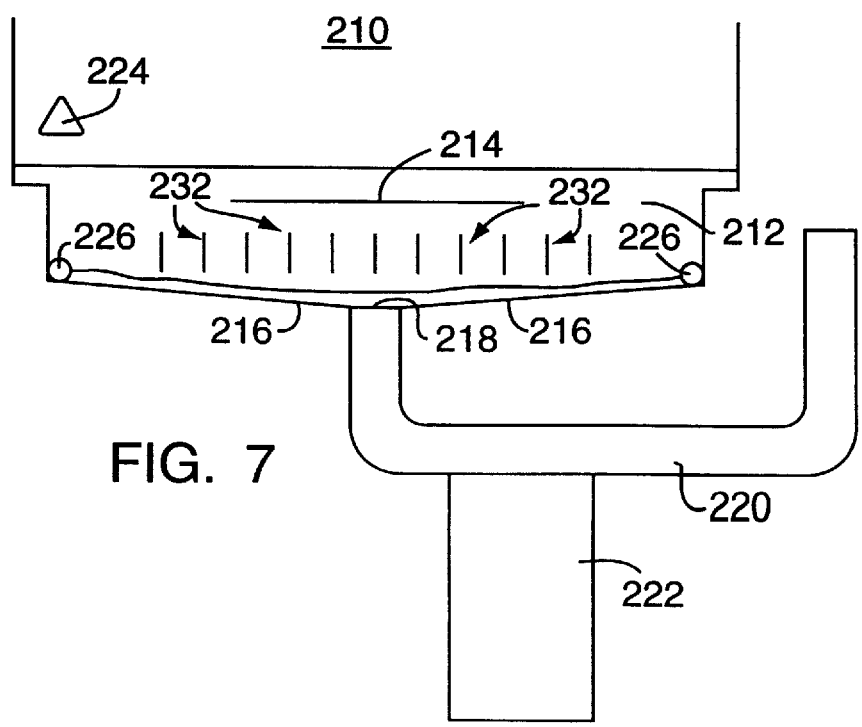
FIG. 7 is a simplified schematic illustration of the fuel cell power plant of FIG. 6 adapted to include oxidant manifold baffling.
Figure 6:
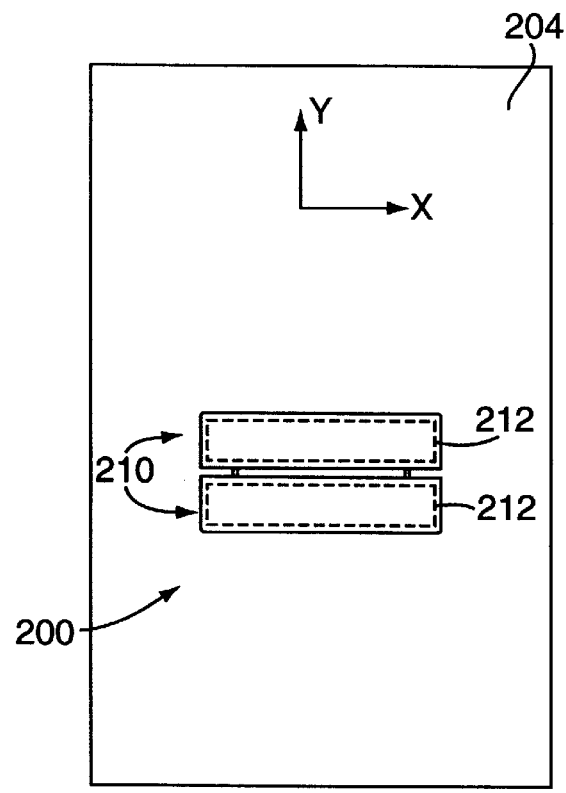
FIG. 6 is a simplified schematic illustration of a motorized vehicle adapted to include a fuel cell power plant according to the present invention.

There are additional modifications of the fuel cell power plant 100 that can be envisioned depending upon its intended use. FIGS. 6 and 7 illustrate one such modification of the oxidant exit manifold 112 which would be advantageous if utilized in an application where the fuel cell power plant 100 as a whole experiences angular displacement, such as during operation of an motorized vehicle equipped with such a fuel cell power plant.

As depicted in FIG. 6, a fuel cell power plant 200 for a motorized vehicle, schematically represented by numeral 204, would typically require two or more fuel cell stacks 210 to be electrically integrated. Each fuel cell stack 210 is equipped with a oxidant exhaust manifold 212, in accordance with the description of the oxidant exhaust manifold 112 of FIGS. 4 and 5, and is preferably oriented approximately perpendicular to the primary axis of movement Y, and negative-Y, of the motorized vehicle 204. That is, the fuel cell stacks 212 are oriented so as to position the longest dimension of the oxidant exhaust manifolds 212 perpendicular to the primary axis of movement of the motorized vehicle 204.

This particular orientation of the fuel cell stacks 210 is important as during operation of the motorized vehicle 204, the coolant that is draining down the inclined housing 216 tends to slosh and therefore pool on one side or the other of the oxidant exhaust manifold 212. If a pooling situation persists long enough, effective decontamination of the coolant flow will be inhibited, as well as possibly depriving the accumulator well portion 220 of sufficient coolant to immerse the accumulator pump 225. Flooding of the fuel cell stacks 210 may also occur. Therefore, by orienting the longest dimension of the fuel cell stacks 210 orthogonal to the direction that the motorized vehicle 204 will most commonly be inclined, in either ascending or descending inclined roadways, the sloshing of the draining coolant can be minimized.

Figure 8:
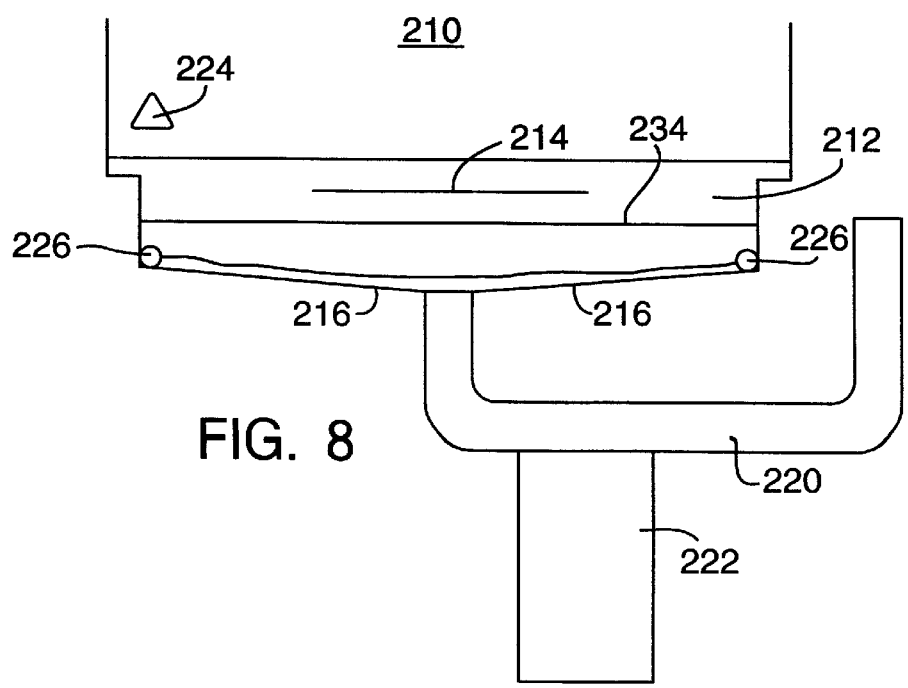
FIG. 8 is a simplified schematic illustration of the fuel cell power plant of FIG. 6 adapted to include an oxidant manifold semi-permeable membrane.

In addition, a plurality of wave barrier baffles 232 may be integrated into the oxidant exhaust manifold 212, in a manner as depicted in FIG. 7, in order to further control the pooling of coolant within the oxidant exhaust manifold 212. In spacing the wave barrier baffles 232 away from the inclined housing 216, the draining coolant will not be impeded in its progress towards the exit 218, while interference with the oxidant flow over the draining coolant can be reduced to a minimum. The baffles are preferably formed from non-metallic material, such as, but not limited to, a polymer or fiber reinforced plastic material, so as not to further contaminate the coolant flow. Alternatively, the wave barrier baffles 232 may be fixed to the inside face of the inclined housing 216 so long as they are adapted to include a plurality of flow-through apertures to allow for passage of the draining coolant. FIG. 8 illustrates the use of a porous hydrophobic barrier 234, which is air permeable yet water impermeable, extending the width of the oxidant exhaust manifold 212. The barrier 234 is fixed to the inside of the oxidant exhaust manifold 212 and serves the same anti-pooling purpose as the wave barrier baffles 232 of FIG. 7. An example of such a porous hydrophobic barrier is a porous Teflon® sheet supported on a plastic screen. The barrier 234 may contain small holes that allow liquid water to pass through the barrier 234 when the fuel cell is shut down, but does not allow significant water passage during operation.

It will be readily appreciated that the motorized vehicle 204 may be of any type or size without departing from the broader aspects of the present invention. Moreover, additional aspects of the fuel cell power plant 200 may differ from the fuel cell power plant 100 of FIGS. 4 and 5, such as, but not limited to, replacing the inlet fans 110 with a duct system which utilizes air streaming by the moving motorized vehicle 204, or existing fans within the motorized vehicle 204, to propel the oxidant through the oxidant exhaust manifold 212.

While the foregoing embodiments are primarily concerned with a fuel cell power plant having a water coolant, the present invention is not limited in this regard as alternative coolants may be utilized as well, without departing from the broader aspects of the present invention. Specifically, an antifreeze solution which is in direct fluid communication with the constituent elements of the fuel cell stack may also be utilized as a coolant, in accordance with commonly assigned co-pending U.S. patent application Ser. No. 09/359,475, filed Jul. 22, 1999, entitled: "DIRECT ANTIFREEZE COOLED FUEL CELL", herein incorporated by reference in its entirety. U.S. application Ser. No. 09/359,475 discloses a coolant system for use with a fuel cell assembly, whereby an antifreeze solution is in fluid communication with the fuel cell assembly, but is kept from contaminating the electrolyte and catalyst layers through a judicious balance of pressures within the fuel cell assembly and the wetproofing of certain constituent elements of the fuel cell assembly.

With respect to the present invention, the coolant fluid stream may be comprised of an antifreeze solution which, as discussed above, is in direct fluid communication with the constituent elements of the fuel cell stack 10. The direct antifreeze solution may be any organic antifreeze solution that is essentially non-volatile at cell operating temperatures. For purposes of the present application, 'non-volatile' is defined to mean that the antifreeze solution sustains a loss of less than 10% of its antifreeze volume for every 500 operating hours of the fuel cell stack 10 at standard operating temperatures.

Alternatively, a first preferred direct antifreeze solution may be a special direct antifreeze solution having the following characteristics:

1) a freezing point of at least −20 degrees Fahrenheit (hereafter "° F.");
2) a surface tension greater than 60 dynes per centimeter (hereafter "dyne/cm") at about 150° F.;
3) a partial pressure of antifreeze above the solution at about 150° F. that is less than 0.005 mm of mercury (hereafter "mm Hg"); and
4) that is capable of being oxidized by catalysts of the fuel cell at fuel cell voltages.

A second preferred antifreeze solution may be an alkanetriol direct antifreeze solution, and, in particular, an alkanetriol selected from the group consisting of glycerol, butanetriol, and pentanetriol. The alkanetriol direct antifreeze may be an antifreeze solution containing any alkanetriol.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A method for removing contaminants from a coolant supply of a fuel cell power plant, said fuel cell power plant including a plurality of electrically integrated fuel cell assemblies and an oxidant manifold, said method comprising the steps of:

flowing an oxidant through said oxidant manifold;

exhausting said coolant from said plurality of electrically integrated fuel cell assemblies; and exposing said exhausted coolant to said oxidant within said oxidant manifold to effectuate the removal of contaminants from said exhausted coolant.

2. The method for removing contaminants from a coolant supply of a fuel cell power plant, said fuel cell power plant including a plurality of electrically integrated fuel cell assemblies and an oxidant manifold according to claim 1, said method further comprising the steps of:

providing an exit from said oxidant manifold, said exit allowing said exposed coolant to drain from said oxidant manifold; and directing said drained coolant back to said plurality of electrically integrated fuel cell assemblies.

3. The method for removing contaminants from a coolant supply of a fuel cell power plant, said fuel cell power plant including a plurality of electrically integrated fuel cell assemblies and an oxidant manifold according to claim 2, said method further comprising the steps of:

treating said exhausted coolant prior to exposing said exhausted coolant to said oxidant; and fixing an exhaust conduit to said exit, said exhaust conduit allowing said oxidant to vent from said fuel cell power plant and adapted to include an accumulator well portion for holding said drained coolant.

4. The method for removing contaminants from a coolant supply of a fuel cell power plant, said fuel cell power plant including a plurality of electrically integrated fuel cell assemblies and an oxidant manifold according to claim 3, said method further comprising the steps of:

passing a predetermined amount of said exhausted coolant through a heat exchanger and a demineralizer prior to exposing said exhausted coolant to said oxidant; and providing a coolant sensor to monitor said accumulator well portion to determine the amount of said drained coolant within said accumulator well portion.

5. The method for removing contaminants from a coolant supply of a fuel cell power plant, said fuel cell power plant including a plurality of electrically integrated fuel cell assemblies and an oxidant manifold according to claim 4, said method further comprising the steps of:
- equipping said fuel cell power plant with a system controller for controlling the operation of said fuel cell power plant;
- providing said system controller with data from said coolant sensor; and
- determining if the amount of drained coolant is less than a predetermined amount, said system controller then restricting the flow of inlet oxidant to said plurality of electrically integrated fuel cell assemblies when said drained coolant falls below said predetermined amount, thereby lowering the rate of water loss from said fuel cell power plant.

6. The method for removing contaminants from a coolant supply of a fuel cell power plant, said fuel cell power plant including a plurality of electrically integrated fuel cell assemblies and an oxidant manifold according to claim 1, said method further comprising the steps of:
- flowing said oxidant through one of an oxidant exhaust manifold and an oxidant inlet manifold.

7. The method for removing contaminants from a coolant supply of a fuel cell power plant, said fuel cell power plant including a plurality of electrically integrated fuel cell assemblies and an oxidant manifold according to claim 3, said method further comprising the steps of:
- adapting said oxidant manifold to include an oxidant baffle for spreading said oxidant approximately uniformly over an interior of said oxidant manifold.

8. The method for removing contaminants from a coolant supply of a fuel cell power plant, said fuel cell power plant including a plurality of electrically integrated fuel cell assemblies and an oxidant manifold according to claim 7, said method further comprising the steps of:
- forming a wave barrier within said oxidant manifold to include one of a pooling baffle arranged at a predetermined angle to said oxidant baffle, and a semi-permeable membrane, said semi-permeable membrane being air permeable and water impermeable.

9. The method for removing contaminants from a coolant supply of a fuel cell power plant, said fuel cell power plant including a plurality of electrically integrated fuel cell assemblies and an oxidant manifold according to claim 1, said method further comprising the steps of:
- utilizing one of a coolant distributor having an aperture and a coolant sprayer to expose said exhausted coolant to said oxidant within said oxidant manifold.

10. A method for removing contaminants from a coolant supply of a fuel cell assembly, said fuel cell assembly having an oxidant manifold, said method comprising the steps of:
- flowing an oxidant through said oxidant manifold;
- exhausting said coolant from said fuel cell assembly; and
- exposing said exhausted coolant to said oxidant within said oxidant manifold to effectuate the removal of contaminants from said exhausted coolant.

11. The method for removing contaminants from a coolant supply of a fuel cell assembly, said fuel cell assembly having an oxidant manifold according to claim 10, said method further comprising the steps of:
- providing an exit from said oxidant manifold, said exit allowing said exposed coolant to drain from said oxidant manifold; and
- directing said drained coolant back to said fuel cell assembly.

12. The method for removing contaminants from a coolant supply of a fuel cell assembly, said fuel cell assembly having an oxidant manifold according to claim 11, said method further comprising the steps of:
- treating said exhausted coolant prior to exposing said exhausted coolant to said oxidant by passing a predetermined amount of said exhausted coolant through a heat exchanger and a demineralizer;
- fixing an exhaust conduit to said exit, said exhaust conduit allowing said oxidant to vent from said fuel cell assembly and adapted to include an accumulator well portion for holding said drained coolant; and
- providing a coolant sensor to monitor said accumulator well portion to determine the amount of said drained coolant within said accumulator well portion.

13. The method for removing contaminants from a coolant supply of a fuel cell assembly, said fuel cell assembly having an oxidant manifold according to claim 12, said method further comprising the steps of:
- equipping said fuel cell assembly with a system controller for controlling the operation of said fuel cell assembly;
- providing said system controller with data from said coolant sensor; and
- determining if the amount of drained coolant is less than a predetermined amount, said system controller then restricting the flow of inlet oxidant to said fuel cell assembly when said drained coolant falls below said predetermined amount, thereby lowering the water loss of said fuel cell assembly.

14. The method for removing contaminants from a coolant supply of a fuel cell assembly, said fuel cell assembly having an oxidant manifold according to claim 10, said method further comprising the steps of:
- flowing said oxidant through one of an oxidant exhaust manifold and an oxidant inlet manifold.

15. The method for removing contaminants from a coolant supply of a fuel cell assembly, said fuel cell assembly having an oxidant manifold according to claim 10, said method further comprising the steps of:
- utilizing one of a coolant distributor having an aperture and a coolant sprayer to expose said exhausted coolant to said oxidant within said oxidant manifold.

16. The method for removing contaminants from a coolant supply of a fuel cell assembly, said fuel cell assembly having an oxidant manifold according to claim 15, said method further comprising the steps of:
- utilizing one of a water coolant and an antifreeze solution coolant.

17. A contaminant removal system for removing contaminants from a coolant supply of a fuel cell power plant, said fuel cell power plant including a plurality of electrically integrated fuel cell assemblies and an oxidant manifold, said system comprising:
- a coolant exit conduit for exhausting said coolant from said fuel cell power plant;
- an oxidant delivery system for flowing said oxidant through said oxidant manifold;
- a coolant delivery system for presenting said exhausted coolant to said oxidant manifold; and
- wherein said exhausted coolant and said oxidant interact with one another within said oxidant manifold to effectuate the removal of contaminants from said exhausted coolant.

18. The contaminant removal system for removing contaminants from a coolant supply of a fuel cell power plant according to claim 17, wherein:

said oxidant manifold is adapted to include an inclined housing having an exit at a low point thereof, said exit allowing said exposed coolant to drain from said oxidant manifold; and said contaminant removal system further includes an exhaust conduit including an accumulator well portion fixed to said exit to accept said drained coolant.

19. The contaminant removal system for removing contaminants from a coolant supply of a fuel cell power plant according to claim 18, wherein:

said oxidant delivery system includes one of a fan and a blower;

said coolant delivery system includes one of a coolant distribution conduit having an aperture formed along the length thereof and a sprayer; and said accumulator well portion includes a coolant sensor for determining the amount of said drained coolant within said accumulator well portion.

20. The contaminant removal system for removing contaminants from a coolant supply of a fuel cell power plant according to claim 18, wherein:

said oxidant manifold adapted to include an oxidant baffle for distributing said oxidant approximately uniformly over said inclined housing.

21. The contaminant removal system for removing contaminants from a coolant supply of a fuel cell power plant according to claim 20, wherein:

said contaminant removal system further comprises:

a demineralizer adapted to treat said exhausted coolant prior to said exhausted coolant being presented to said oxidant manifold; and a system controller for controlling the operation of said fuel cell power plant.

22. The contaminant removal system for removing contaminants from a coolant supply of a fuel cell power plant according to claim 21, wherein:

said oxidant manifold comprises one of an oxidant inlet manifold and an oxidant exhaust manifold.

23. The method for removing contaminants from a coolant supply of a fuel cell assembly, said fuel cell assembly having an oxidant manifold according to claim 22, said method further comprising the steps of:

utilizing one of a water coolant and an antifreeze solution coolant.

* * * * *